United States Patent [19]
Connell

[11] 3,991,264
[45] Nov. 9, 1976

[54] TERMINAL BOX FOR CABLES

[75] Inventor: Clayton C. Connell, Leesburg, Fla.

[73] Assignee: Telephone Utility Terminal Company, Inc., Leesburg, Fla.

[22] Filed: Oct. 15, 1975

[21] Appl. No.: 622,581

[52] U.S. Cl. .................................. 174/38; 174/51; 174/60; 220/3.94; 220/4 E; 248/201; 248/299; 317/118; 317/120
[51] Int. Cl.² ........................................ H02G 9/02
[58] Field of Search ................... 174/38, 51, 60, 92; 138/162; 220/3.92, 3.94, 4 E, DIG. 25; 248/201, 299; 317/117, 118, 119, 120

[56] References Cited
UNITED STATES PATENTS

| 874,834 | 12/1907 | Copping | 174/136 |
|---|---|---|---|
| 3,092,277 | 6/1963 | Brim | 220/4 E X |
| 3,309,456 | 3/1967 | Connell | 174/38 |
| 3,404,212 | 10/1968 | Mack et al. | 174/38 |
| 3,757,031 | 9/1973 | Izraeli | 174/92 X |
| 3,872,234 | 3/1975 | Smith | 174/38 |

FOREIGN PATENTS OR APPLICATIONS

| 113,657 | 4/1969 | Denmark | 174/60 |
|---|---|---|---|
| 756,120 | 9/1933 | France | 317/120 |
| 1,440,082 | 2/1969 | Germany | 174/92 |

*Primary Examiner*—Laramie E. Askin
*Attorney, Agent, or Firm*—Beveridge, DeGrandi, Kline & Lunsford

[57] ABSTRACT

A terminal box for use with telephone cable systems has a housing formed of geometrically identical channels interfitted by tongue and groove edge portions. Within the housing, vertical brackets for terminal blocks are movable along U-shaped horizontal supports to permit an increase in spacing between terminal blocks when making electrical connections and/or to permit mounting of and access to electrical components located behind the vertical brackets without removal of the vertical bracket.

9 Claims, 4 Drawing Figures

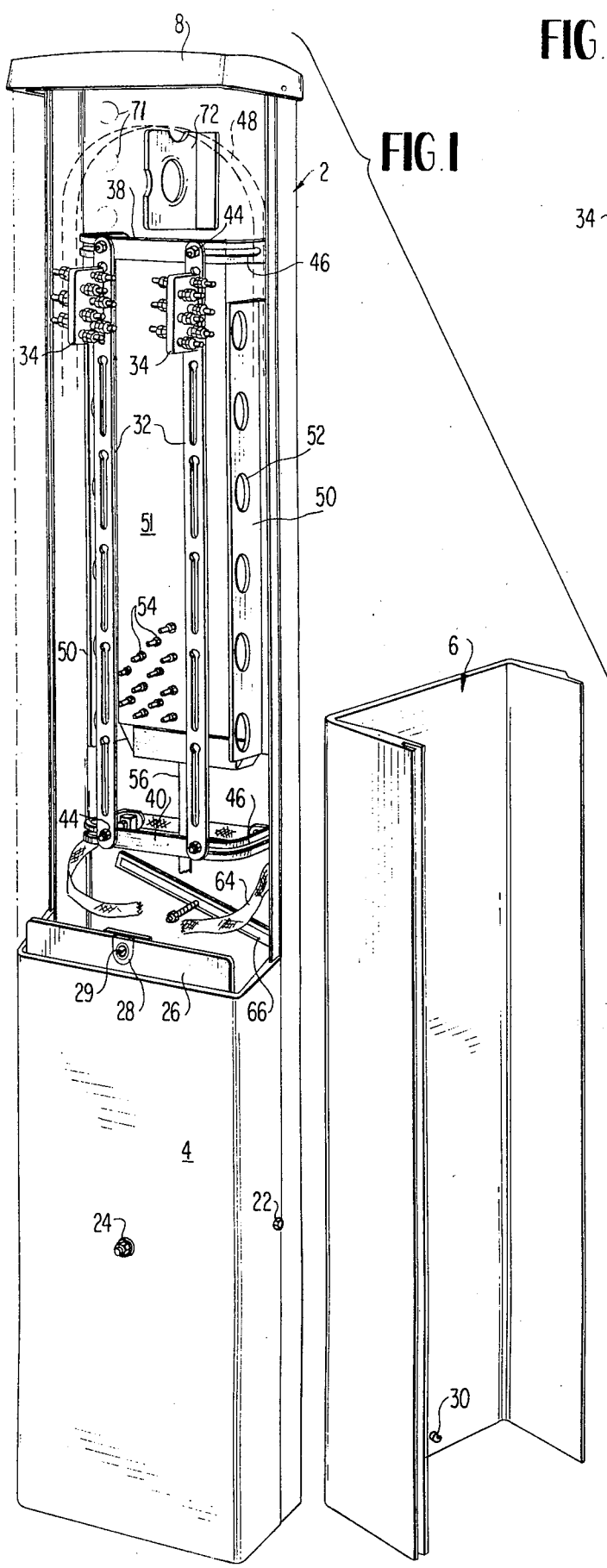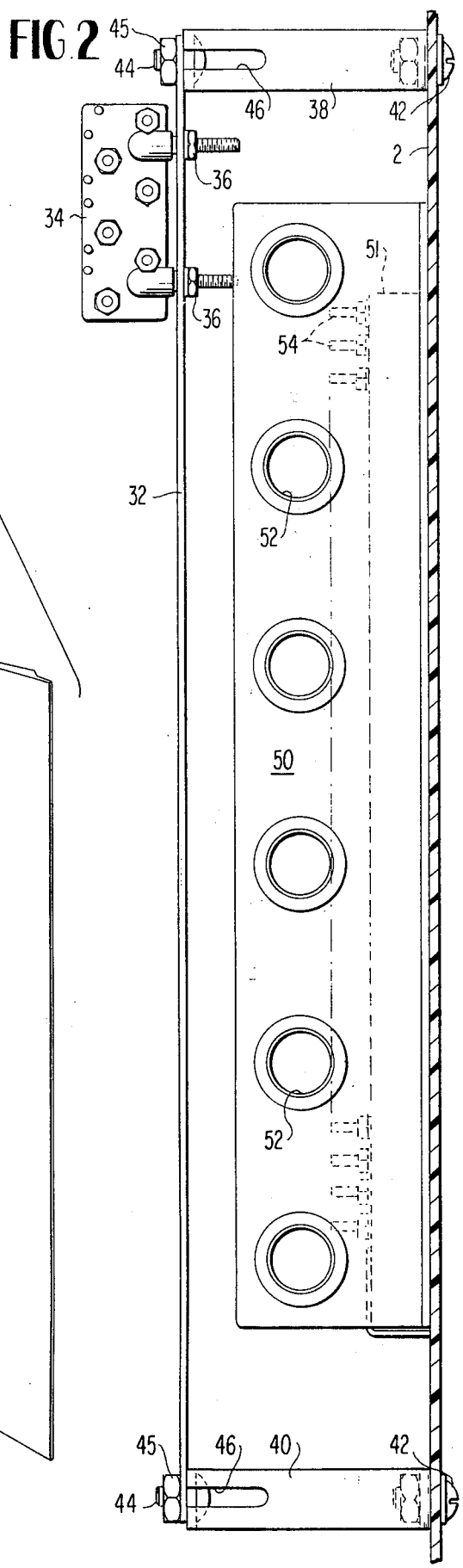

TERMINAL BOX FOR CABLES

This invention relates to a terminal box for telephone cable systems. Such terminal boxes are classified in the U.S. classification system, Class 174, subclass 38.

The terminal box of the invention has its primary use in connection with communication systems wherein underground or aerial cables having a substantial number of conductors are used to provide telephone or other communication services to a large number of customers. At points along the cables, an inverted U-shaped loop is formed in the cable to extend above the surface of the ground. In these above-ground loops, conductors are removed from the cables and spliced to a continuation of the feed cable, or "terminated," i.e., electrically connected to conductors which lead to the individual customers located in the vicinity of the loop. The loop and the means for providing the electrical connections are normally protected from tampering and the weather by a terminal box, an improved form of which is the subject of this invention.

Under certain circumstances, existing practices dispense with the formation of an above-ground loop and use in lieu thereof a fixed-count termination block which is a body of electrically insulating material provided with a number of exposed binding posts to which electrical connections are made. A cable having a plurality of conductor pairs is permanently connected to the block, with each conductor therein being electrically connected within the sealed block to one of the binding posts. When this type of component is used, each of the conductors in the cable of the fixed count termination block is connected, usually underground, to a conductor in the main underground cable which has more conductor pairs than the fixed count termination strip. When this is done, the conductors in the main cable are not broken, thereby permitting their use for servicing customers further down the feed cable line if they are unneeded at the location of the fixed count termination strip. The terminal box disclosed herein is capable of use in such a system.

Typical fixed count termination blocks are made and sold by Reliable Electric Company of Franklin Park, Ill. under the designations ST 11 HC, ST 26 HC and ST 51 HC. One of their uses is to "cross-connect" whereby their binding posts are connected by jumper wires to terminals on standard six pair terminal blocks, the latter also being connected to customer service distribution conductors.

The present invention differs from prior terminal boxes with respect to the construction of the terminal box housing, the terminal block supports within the housing and the ability of the housing to receive and permit work on an electrical component such as a fixed count termination strip.

One subject of the invention is to provide for a simple and relatively inexpensive form of housing for terminal boxes. This objective is achieved by forming the housing of two geometrically identical channel sections, each channel section having a tongue at the end of one leg, and a groove located at the end of the other leg. The sections are placed together so that one channel has a groove receiving the tongue of the other channel, and a tongue projecting into the groove of the other channel. This simplifies construction and contributes to the economy of manufacturing these components.

Two further objectives are to maximize the efficient use of the space within the enclosure and to facilitate the tasks of workers when making electrical connections in such a system. These objectives are achieved by providing horizontal support means attached to and located within the housing, the support means slidably supporting a plurality of vertical brackets for standard terminal blocks. During times of normal telephone service when the terminal box is closed, the vertical brackets will be relatively close to each other; however, the horizontally slidable movement of the brackets permits workers to move them apart to facilitate the making of any electrical connections. Preferably but not essentially, the horizontal movement of the brackets carries them around an arcuate portion of the horizontal support, causing them to rotate about vertical axes so that the rear face of a bracket will be exposed to simplify the attachment of terminal blocks to it.

Another object of the invention is to permit the concurrent mounting of diverse electrical components such as a fixed count termination strip and standard terminal blocks. This capability is attributable to the horizontal mobility of the vertical brackets which permits their displacement laterally from a seat provided for a fixed count termination strip.

Still another object of the invention is to provide for a neat and effficient management of the electrical conductors within the housing including the main cable, conductor pairs removed therefrom, conductor pairs for the individual customers, and jumpers used between various electrical components within the terminal box.

For a more complete understanding of the inventive concepts, reference is made to the following description and to the accompanying drawings which illustrate a preferred structure which utilizes all of the inventive features discussed above.

FIG. 1 is a perspective view of a terminal box constructed according to the invention, showing a fixed count termination strip and representative terminal blocks therein. An above-ground cable loop is shown only in broken lines.

FIG. 2 is a side elevation of a portion of the apparatus showing one of the vertical brackets, the upper support therefor and a conventional terminal block mounted thereon;

Referring to FIG. 1, it will be observed that the housing includes a rear channel 2, and a front channel comprising a lower section 4 and an upper section 6 which is readily removable to afford access to the interior of the terminal box. A cap 8 is permanently attached by rivets to the upper end of the rear channel 2, and this cap has a top and four depending walls which receive therein the upper ends of both the rear channel 2 and the upper section 6 of the front channel. All elements 2–8 are preferably made of an electrically insulating synthetic polymer such as ABS or PVC plastic.

Figure 3:
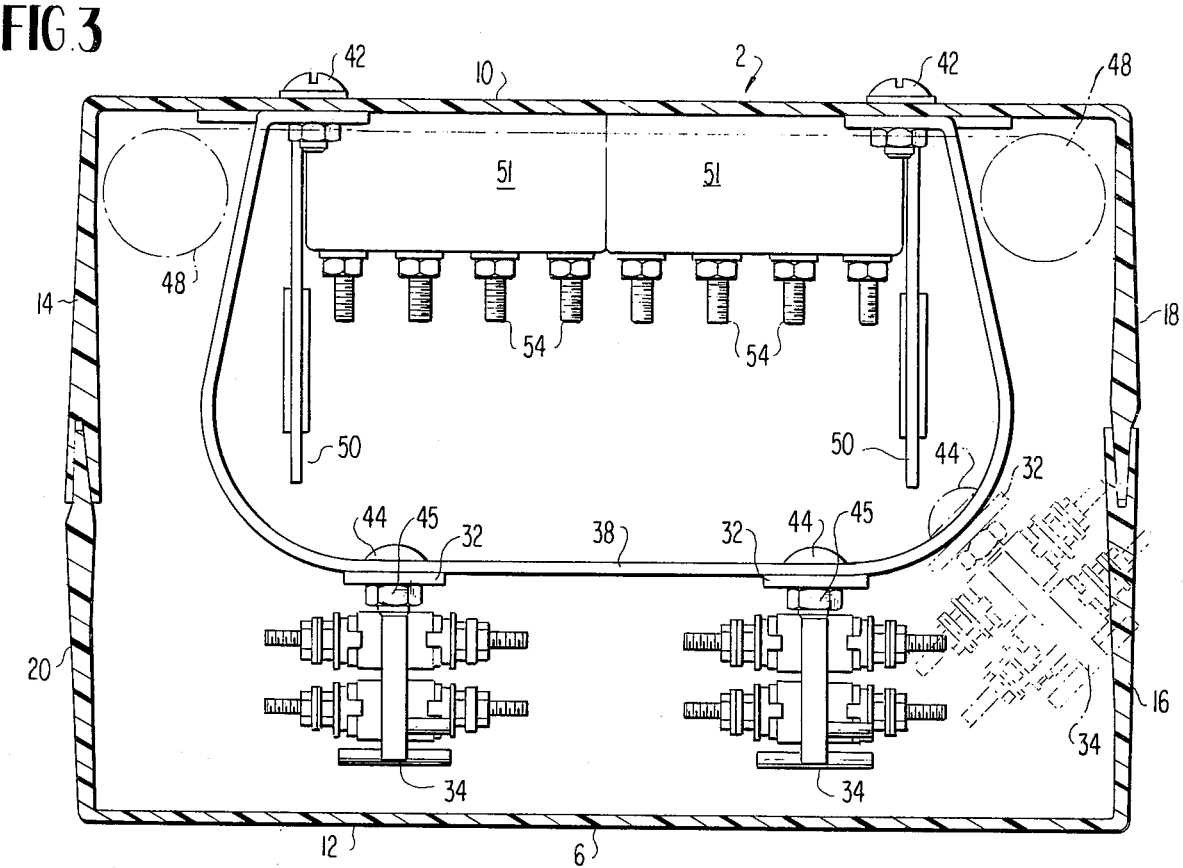
FIG. 3 is a sectional plan view showing the configuration of the preferred horizontal support means and the interfitting relationship between the channels which form the housing.

In FIG. 3, it will be seen that the channels are geometrically identical in cross section, each being U-shaped with the base 10 of the rear channel forming the rear wall of the housing and the base 12 of the front channel forming the front wall of the housing. The left leg 14 of the rear channel and the right leg 16 of the front channel are each provided with a recess forming an outwardly tapered groove. Correspondingly, the right leg 18 of the rear channel and the left leg 20 of the front channel are provided with edges which form inwardly tapered tongues each being received in the respective groove of their opposed member. This particular arrangement is quite convenient, in that identical injection molded sections may be used for forming the major components of the housing, and they provide an efficient weathertight seal.

The lower section 4 of the front channel is infrequently removed so it is attached to the rear channel 2 by means of screws 22 and a nut 24 threaded onto a rod which is threadedly received in a boss on the interior wall of the rear channel 2. The nut 24 causes the lower section 4 of the front channel to bear firmly against the rear channel 2; and, the screws 22 serve as a stop means to prevent vertical movement between the elements 4 and 6. A piece 26 is permanently attached to the section 4 and projects upwardly from the rear surface of the front face thereof to support one element 28 of a DZUS fastener of the type generally described in U.S. Pat. No. 3,417,441.

As previously mentioned, the upper section 6 of the front channel is removable from the housing to afford access to the housing interior. The upper end of section 6 is retained in place by the sidewalls of the cap 8, and its lower end is provided with a rotatable stud element 30 provided with opposed cam slots which upon rotation engage the spring wire retainer 29 in element 28 of the DZUS fastener.

The housing normally will be attached either to an above-ground post or to a galvanized stake driven into the ground. In either instance, the rear channel is provided with two openings (not shown) for bolts or lag screws which attach the rear channel to the supporting structure.

Within the housing, there are a pair of vertical brackets 32, each of which is provided with six keyhole slots which receive and support standard six pair terminal blocks 34. These terminal blocks are conventional components well known in the telephone field, and are formed of an electrically insulating block which supports a plurality of conductive binding posts provided with means for connecting and retaining electrical conductors. Threaded fasteners 36 attach the terminal blocks to the vertical brackets 32 in the manner illustrated in FIG. 2.

Both vertical brackets 32 are supported at their upper ends by a U-bracket 38 and at their lower ends by a U-bracket 40. These brackets serve as horizontally elongated supporting members, and they are attached to the rear wall 10 of the housing by means of fasteners 42 as will be seen in FIG. 3. Connectors, preferably bolts 44, connect the upper and lower ends of the vertical brackets 32 to the upper and lower U-brackets 38 and 40, the bolts 44 projecting forwardly and nonrotatably through the horizontal elongated slots 46 in the respective U-brackets 38 and 40, and through openings in the upper and lower ends of the vertical brackets 32. Nuts 45 may be loosened and tightened as appropriate to hold the vertical brackets 32 in place or to permit their movement. The horizontal mobility of the bolts 44 on the horizontal U-brackets 38 and 40 permits movement apart of the vertical brackets to facilitate access to the terminal blocks thereon without removal of the vertical brackets 32. When the vertical brackets 32 are relatively close together as illustrated, it is extremely difficult to work on any components located behind the brackets 32, or to work on the binding posts which confront each other on the horizontally adjacent terminal blocks. However, by moving a vertical bracket 32 to the position shown in broken lines in FIG. 3, the distance between the terminal blocks is increased to simplify work on them. Upon completion of the work, the vertical bracket 32 and the attached terminal blocks will be restored to their normal central position.

Although the horizontal supports 38 and 40 may be linear, it is preferred that they be in the disclosed U-shpae. One advantage resulting from this configuration is that this provides an arcuate section along which the bolts 44 and vertical brackets 32 are guided, thereby causing the vertical brackets 32 to turn and provide access to their rear faces. This makes it more convenient to attach the terminal blocks to the brackets, and also makes it somewhat easier to work on the inner set of binding posts on the terminal blocks. It is also desirable to space the legs of the U-brackets 38 and 40 from the sidewalls of the housing. This defines spaces for positioning of the looped cables which lead upwardly through the housing between the legs of the U-brackets and the sidewalls of the housing. The position of such a cable is shown at 48.

In the area between the U-brackets 38 and 40, there are partitions 50 provided with openings 52. The partitions 50 serve as vertical divider means which extend forwardly form the rear wall of the housing. The openings in the partitions 50 are provided so that conductors may be passed therethrough in an organized fashion to minimize the clutter of conductors and connections within the terminal box.

Further, the partitions 50 provide a seat therebetween for a fixed count termination strip of the type previously described above, a typical one being commercially available, under the designation ST-51 from Reliable Electric Company of Franklin Park, Ill. Such a termination strip 51 is attached by bolts to the rear wall of the housing. It has a plurality of forwardly projecting binding posts 54, each of which is electrically connected to a conductor in the cable 56 which is tapped in underground to a main cable from a central location such as a telephone company central office. As may be seen from FIG. 3, the horizontal mobility of the vertical brackets 32 permits them and terminal blocks mounted thereon to be moved laterally from the position occupied by the fixed count termination strip, thereby facilitating mounting of the termination strip 51 and work on its elements. When cross-connecting, jumper conductors are run from the posts 54 on termination strip 51 to the binding posts of the terminal blocks 34, with customer service conductors then extending from the terminal blocks 34 to the service lines which lead to the customers.

Figure 4:
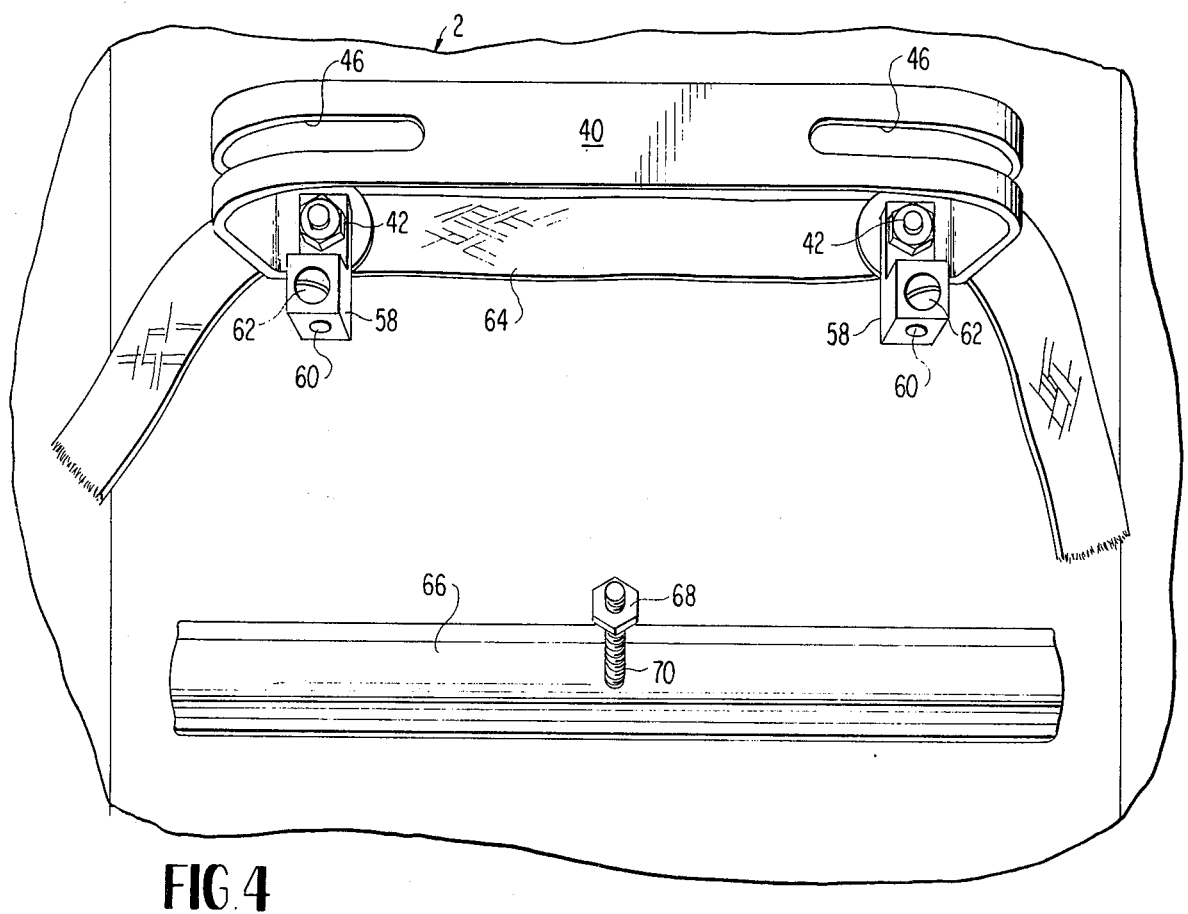
FIG. 4 shows the grounding system and the lower horizontal support for the vertical brackets.

The disclosed construction has means shown in FIG. 4 for electrically grounding the cables and terminal blocks located therewithin. A standard ground rod (not shown) is driven into the earth at the location of the terminal box and is connected by a wire to a grounding clip 58 which is in electrical contact with the lower U-bracket 40. Bolts 42 pass through a mounting opening in lug 58 and also secure the U-bracket 40 to the rear wall of the housing. Two lugs 58 are provided and each has an opening 60 which receives the wire from the ground rod and holds it in place by means of the setscrew 62. Either one of the lugs 58 may be used, depending on the location of the ground rod.

Also held in place by bolts 42 is a grounding strap 64, a braided flexible electrically conductive strap having two exposed ends. When an above-ground cable loop is positioned in the terminal box, the ends of strap 64 are connected by standard lugs to the metallic sheathing of the cable. A bar 66 is tightened against the cable by means of a nut 68 on threaded rod 70 which is secured to a boss on the interior rear wall of the housing.

When connections are made to underground customer service lines, the underground service lines can exit the housing through its open lower end. When connections are made to above-ground customer service lines, the conductor may exit the housing by removing one of the knockouts 71 at the upper end of the housing, running the conductor therethrough, preferably also sealing the space around the conductor with a grommet to prevent moisture from entering the housing.

The manner in which the terminal box is used will be evident from the foregoing description. In most installations, it will be used for receiving above-ground loops formed in underground main cables. Such a loop will rest with its uppermost end on the support piece 72 and its opposite legs extending downwardly, lying laterally outside the U-straps 38 and 40, between the sidewalls of the housing and the respective divider means 50, and beneath the bar 66 which is tightened thereagainst. Above the bar 66, the sheathing of the main cable will be removed and selected conductor pairs will be broken out of the loop. Some of these pairs may be reserved for future service at the particular terminal box, and others may be connected to terminal blocks 34 from which customer service lines are led to the individual customers.

In situations where a fixed count terminal strip is used to "cross-connect," it is not necessary to loop the main cable within the housing. Instead, the conductors in cable 48 of the fixed count termination strip 51 are tapped underground into the conductors of a main cable. The individual binding posts 54 on the termination strip 51 are connected by jumpers to binding posts on the terminal blocks 34 which are connected also to the customer service lines which lead to customers being serviced by the particular terminal box.

From this description, it will be appreciated that the disclosed apparatus uses several novel principles which contribute greatly to the simplicity, flexibility and/or convenience of the terminal box. Of course, it is not necessary to have the precise construction shown hereinabove to realize these advantages, inasmuch as the inventive concept may take many different forms while relying on one or more of the same basic principles and producing one or more of the same advantages. Therefore, it is emphasized that the invention is not limited only to the disclosed and preferred embodiment, but it encompasses other structures which fall within the scope and spirit of the claims which follow.

I claim:

1. A terminal box for use in installations where incoming conductors from a central location are connected to customer service distribution conductors, said terminal box comprising,
    a housing with a removable panel which affords access to the interior thereof,
    a plurality of vertical brackets located within the housing, means on the vertical brackets for supporting terminal blocks which connect incoming conductors to customer service distribution conductors,
    supporting means connected to the housing and located in the interior thereof supporting the vertical brackets within the housing, said supporting means including an upper horizontal elongated member and a lower horizontal elongated member, connector means connecting vertically spaced portions of at least one of the vertical brackets respectively to the upper and lower horizontal elongated members, said connector means being horizontally movable on the horizontal members to permit movement apart of the vertical brackets to facilitate access to terminal blocks thereon and/or electrical components therebehind,
    both of said horizontal members including an arcuate section along which the connector means are slidable to turn the respective vertical bracket and provide access to the rear face of the vertical bracket for attachment of terminal blocks thereto.

2. The terminal box of claim 1 wherein both horizontal members are U-shaped in horizontal cross-section and have their opposite ends connected to the housing.

3. The terminal box of claim 2 wherein the housing has sidewalls, the U-shaped horizontal members having legs spaced from the sidewalls of the housing to define spaces for the positioning of a cable between the legs and the sidewalls.

4. The terminal box of claim 1 wherein the housing has a rear wall and forwardly projecting sidewalls, said rear wall having a seat for a fixed count termination strip, said vertical brackets being movable from positions lying forward of the seat to positions displaced laterally from the seat to facilitate the mounting of and access to a fixed count termination strip positioned in the seat.

5. The terminal box of claim 4 having partitions provided on opposite sides of said seat, said partitions having openings for the passage of conductors therethrough.

6. A terminal box for use in installations where incoming conductors from a central location are connected to customer service distribution conductors, said terminal box comprising,
    a housing with a removable panel which affords access to the interior thereof, said housing having a rear wall,
    a plurality of electrical components mounted on the rear wall of the housing,
    a plurality of vertical brackets located within the housing at a location forwardly of said electrical components,
    terminal blocks supported on the vertical brackets for connecting incoming conductors to customer service distribution conductors,
    supporting means connected to the housing and located in the interior thereof and supporting the vertical brackets within the housing, said supporting means including an upper horizontal elongated member and a lower horizontal elongated member, connector means connecting vertically spaced portions of at least one of the vertical brackets respectively to the upper and lower horizontal elongated members, said connector means being horizontally movable on the horizontal members to permit movement apart of the vertical brackets to facilitate access to said electrical components therebehind.

7. The terminal box of claims 6 wherein both horizontal members include an arcuate section along which the connector means are slidable to turn the respective vertical bracket and provide access to the rear face of the vertical bracket for attachment of terminal blocks thereto.

8. The terminal box of claim 7 wherein both horizontal members are U-shaped in horizontal cross-section and have their opposite ends connected to the housing.

9. The terminal box of claim 8 wherein the housing has sidewalls, the U-shaped horizontal members having legs spaced from the sidewalls of the housing to define spaces for the positioning of a cable between the legs and the sidewalls.

* * * * *